United States Patent [19]

Dahl

[11] 3,879,514

[45] Apr. 22, 1975

[54] METHOD OF PRODUCING BURNED CRYSTALLINE CARBONATE MINERALS

[75] Inventor: Erik Qvale Dahl, Vagsbygd, Norway

[73] Assignee: Elkem-Spigerverket A/S, Oslo, Norway

[22] Filed: Oct. 4, 1972

[21] Appl. No.: 294,873

[30] Foreign Application Priority Data

Oct. 8, 1971 Norway.............................. 3699/71

[52] U.S. Cl. ...................... 264/63; 264/44; 264/59; 264/66
[51] Int. Cl. ...................... C04b 35/64; C04b 33/32
[58] Field of Search ............ 264/56, 63, 66, 42, 43, 264/59

[56] References Cited

UNITED STATES PATENTS

| | | | |
|---|---|---|---|
| 3,233,017 | 2/1966 | Weaver et al.......................... | 264/63 |
| 3,368,010 | 2/1968 | Cummings............................. | 264/63 |
| 3,666,851 | 5/1972 | Chaklader............................. | 264/66 |
| 3,712,599 | 1/1973 | Davies et al. ......................... | 264/66 |
| 3,729,329 | 4/1973 | Morris et al. ......................... | 264/63 |

*Primary Examiner*—Donald J. Arnold
*Attorney, Agent, or Firm*—Eyre, Mann & Lucas

[57] ABSTRACT

A process for the production of burned crystalline carbonate materials is disclosed. The crystalline mineral is pulverized to a size smaller than the size of its single crystals, admixed with water and a binding agent and then pelletized and burned at temperatures above 900°C. to form a mecanically strong agglomerate.

3 Claims, No Drawings

METHOD OF PRODUCING BURNED CRYSTALLINE CARBONATE MINERALS

The present invention relates to a new and useful method of producing mechanically strong agglomerates from crystalline carbonate minerals.

Carbonate minerals are used extensively in the smelting industry as raw materials for the production of calcium carbide and metal products such as magnesium metal and alloys comprising magnesium and/or calcium as alloying components. The carbonate minerals are used as slagforming and fluxing materials, as refining materials in the steel industry and in refractory materials. The carbonate minerals are usually calcined before they are used in the smelting industry. During the calcination process, which usually takes place at temperatures of 1000°–1500°C., the carbonates are decomposed and carbon dioxide is liberated.

Carbonate minerals occur in nature in both the amorphous and crystalline form. The amorphous types of carbonate material will generally maintain their form and lump size during the calcining process but the crystalline types will tend to decrepitate, i.e., be broken up into single crystals. Since these crystals are very small they are normally referred to as dust or fines and, because of the known problems encountered with dust or fines, they have been considered unusable in smelting processes. This problem is especially evident with crystalline limestone and crystalline dolomite.

There has now been discovered a process by which mechanically strong sintered agglomerates can be formed from crystalline decrepitating carbonates. The invention comprises pulverizing the crystalline carbonate to a size smaller than the size of its single crystals, combining the thus pulverized material with water and a binding agent, pelletize, and then burning the admixture at temperatures above 900°C. whereby a sintered agglomerate is formed which can be used in the smelting industry in calcination processes without the usual problems of dust or fines.

The absolutely critical step in the process is that the crystalline carbonate be pulverized to a size smaller than its single crystal size. While it would be expected that this would cause additional dusting and fines problems, it has been discovered that quite the contrary is true in the process of the present invention and that an agglomerate material is formed which has very little dust and fines, usually even less than the strong type of amorphous carbonates. It has been found that pulverization of crystalline dolomite or crystalline limestone to a specific surface of more than 5000 cm$^2$ per cm$^3$ is suitable for the present invention. The pulverization is done in known manner and may be by either the wet or dry method.

After the crystalline carbonate is pulverized it is combined with water and a binding agent to form agglomerates of the pulverized material. The amount of water to be added to form agglomerates is within the skill of the art and is generally from about 5 to about 15 parts by weight of carbonate material. Similarly the amount of binding agent to be added to form the agglomerates is within the skill of the art and should generally be from about 0.5 to about 5 parts by weight of carbonate material.

After the carbonate material is agglomerated, it is burned at temperatures above 900°C. and preferably at temperatures of 1000°–1500°C. Normally the agglomerated material is pelletized before burning and the agglomerates are dried before the burning process. Burning is suitably done in a rotary kiln or a vertical shaft furnace and the drying can also take place in a lower temperature zone of the rotary kiln or shaft furnace or the drying can be done in a separate drying furnace if desired.

The binding agent of the present invention may be any binding agent which will hold the pulverized carbonate mineral in agglomerated condition during the burning process. Suitable binding agents include bentonite, sulphite lye, molasses, silica-dust, alumina, or burned carbonate material such as burned dolomite, burned lime or burned magnesia. It is especially of advantage to use the dust which is formed during the burning process as the binder for subsequent formation of agglomerates. Where the process employed is a continuous one, part of the dust formed during the burning process can be returned to the process for use as the binder material. This has obvious economic advantage and it also has technical advantage since there is no introduction of a foreign binding agent.

When forming the agglomerated material, it is sometimes desirable to add other materials such as reducing agents, fluxes, or alloying components to be used in the subsequent smelting process so that the agglomerated material obtained is better suited for the subsequent smelting process.

Quite surprisingly the burned agglomerates of the present invention have very high strength compared to amorphous carbonates found in nature. Pellets formed according to the present invention from pulverized crystalline dolomite with 3% returned dust and 1% bentonite and calcined in a rotary kiln at temperatures up to 1100°C. were compared to natural crystalline dolomite, amorphous dolomite of the usual type and amorphous dolomite of the strong type and the following sieve analysis was obtained.

| | Pulverized crystalline dolomite with 3% returned dust and 1% bentonite | Natural crystalline dolomite | Amorphous dolomite, usual type | Amorphous dolomite, very strong type |
|---|---|---|---|---|
| On 16 mm | 0% | 3.3% | 15.0% | 48.1% |
| On 8 mm | 99.0% | 6.8% | 38.5% | 82.4% |
| On 4 mm | 99.0% | 8.0% | 55.9% | 87.4% |
| On 2 mm | 99.0% | 8.8% | 62.3% | 89.5% |
| On 1 mm | 99.6% | 11.0% | 67.2% | 90.4% |
| Thru 1 mm | 0.4% | 89.0% | 32.8% | 9.6% |

It has also been quite surprisingly found that the calcined agglomerates of the present invention have far better handling strength than natural carbonate materials. Handling strength of the materials was tested in a rotary drum equipped with internal ribs in order to effect abrasion. Pellets produced from crystalline dolomite in accordance with the present invention gave 0.5–3% dust after 200 revolutions in the rotary drum and 1–10% after 1000 revolutions. Lump amorphous lime burned in a similar manner gave 10–40% dust after 200 revolutions and burned amorphous dolomite gave 20–90% fines after 200 revolutions.

The following examples are illustrative of the present invention and in each of the examples the compression strength of the burned agglomerate is given as well as dust formation measured as percentage of thru 1 mm material after 1000 revolutions in the rotary drum equipped with internal ribs.

EXAMPLE 1

Crystalline dolomite was pulverized below its single crystal size and was admixed with 10% by weight water, 2% by weight bentonite and 2% by weight silica-dust, the latter two being the binding agents. The composition was formed into pellets and the raw pellets had a compression strength of 1.6 kilos. The pellets were dried in a drying furnace and in the dried state the compression strength was 7 kilos. The pellets were then transferred to a rotary kiln wherein they were burned at temperatures up to 1200°C. Samples taken out at 1100°, 1150° and 1200°C. had compression strengths of 12, 16 and 18 kilos respectively. The dust formation (percent material thru 1 mm) for the material burned at 1150°C. was 3.5% after the 1000 revolutions of the ribbed rotary drum.

EXAMPLE 2

Crystalline dolomite was pulverized to below its single crystal size and combined with 8% alumina, 5% returned dust and sufficient water to form agglomerates. The raw pellets obtained had a compression strength of 2.8 kilos and after drying the pellets had a compression strength of 20 kilos. After burning in a rotary kiln at 1200°C., the burned pellets had a compression strength of 26 kilos. The dust formation was 3%. (Drum test)

EXAMPLE 3

Pellets were produced from pulverized crystalline dolomite which had been reduced below its single crystal size combined with 8% alumina, 3% bentonite and sufficient water to form the agglomerates. The pellets were dried in a low temperature zone of a rotary kiln and were then burned in the rotary kiln at temperatures up to 1100°C. The raw and dried pellets had compression strengths of 1.5 and 11 kilos respectively whereas the compression strength of the burned pellets was 55 kilos. Sieve analysis showed that 99% of the burned material had a grain size above 4 mm and dust formation after treatment in the ribbed rotary drum was 4.5%.

EXAMPLE 4

Pellets produced in accordance with Example 3 were burned in a shaft furnace in which the maximum temperature was varied from 1250° to 1350°C. and the pellets were measured for compression strength and dust formation. The results of the tests are given in the table below.

| Burning temperature °C. | 1250 | 1350 |
|---|---|---|
| Compression strength, kilos | 33 | 60 |
| Dust formation (Drum test) | 5.0% | 4.0% |

EXAMPLE 5

Pellets were produced from crystalline limestone pulverized below its single crystal size with 3% binder and sufficient water to form the agglomerate. The pellets were dried and then burned in a shaft furnace at 1325°C. The compression strength of the burned pellets was 46 kilos and dust formation was 1%.

It will be understood that the claims are intended to cover all changes and modifications of the preferred embodiments of the invention, herein chosen for the purpose of illustration, which do not constitute departures from the spirit and scope of the invention.

What is claimed is:

1. The method of producing burned crystalline carbonate materials to form agglomerates suitable for use in smelting processes comprising:
   a. pulverizing a carbonate material selected from the group consisting of crystalline dolomite and crystalline limestone to a size less than the single crystal size of the carbonate material.
   b. admixing the pulverized carbonate material with binding agent in an amount from about 0.5 to about 5 parts by weight of carbonate material and sufficient water to form a raw agglomerate, at least a part of the binding agent being dust formed from a prior burning of the same carbonate material,
   c. drying the raw agglomerate,
   d. burning the agglomerate at a temperature from about 1000° to about 1500°C., and
   e. using the burned agglomerate material obtained in a smelting process.

2. The method of claim 1 wherein the carbonate material is pulverized to a specific surface of at least 10,000 cm$^2$ per cm$^3$.

3. The method of claim 1 wherein the binding agent includes a member selected from the group consisting of bentonite, sulphite lye, molasses, silica-dust, and alumina.

* * * * *